United States Patent
Ansari et al.

(10) Patent No.: US 12,532,897 B2
(45) Date of Patent: Jan. 27, 2026

(54) FROZEN CONFECTION MANUFACTURE

(71) Applicant: Magnum ICC US, LLC, Wilmington, DE (US)

(72) Inventors: Mansoor Ahmed Ansari, Bedford (GB); Georgios Tetradis-Mairis, Bedford (GB)

(73) Assignee: MAGNUM ICC US, LLC, Wilmington, DE (US)

( * ) Notice: Subject to any disclaimer, the term of this patent is extended or adjusted under 35 U.S.C. 154(b) by 284 days.

(21) Appl. No.: 16/309,144

(22) PCT Filed: Jun. 1, 2017

(86) PCT No.: PCT/EP2017/063309
§ 371 (c)(1),
(2) Date: Dec. 12, 2018

(87) PCT Pub. No.: WO2017/220309
PCT Pub. Date: Dec. 28, 2017

(65) Prior Publication Data
US 2019/0328003 A1    Oct. 31, 2019

(30) Foreign Application Priority Data
Jun. 22, 2016  (EP) .................................. 16175674

(51) Int. Cl.
*A23G 9/38*       (2006.01)
*A23D 7/00*       (2006.01)
(Continued)

(52) U.S. Cl.
CPC ............... *A23G 9/38* (2013.01); *A23D 7/003* (2013.01); *A23D 7/02* (2013.01); *A23G 9/44* (2013.01);
(Continued)

(58) Field of Classification Search
CPC .... A23G 9/38; A23G 9/44; A23G 9/52; A23P 10/30; A23P 10/40; A23D 7/003; A23D 7/02
See application file for complete search history.

(56) References Cited

U.S. PATENT DOCUMENTS 2,694,643  A   11/1954  Robinson et al.
3,183,098  A    5/1965  Baur
(Continued)

FOREIGN PATENT DOCUMENTS

CN      1315834     10/2001
CN    101170909      4/2008
(Continued)

OTHER PUBLICATIONS

IPRP2 in PCTEP2017063309; Aug. 29, 2018; pp. 1 to 16.
(Continued)

*Primary Examiner* — Katherine D Leblanc
(74) *Attorney, Agent, or Firm* — Pabst Patent Group LLP

(57) ABSTRACT

Disclosed is a process for manufacturing a concentrate for making a premix for a frozen confection, wherein the concentrate is in the form of granules. The process comprises the steps of: (a) forming an oil-in-water emulsion wherein the fat droplets in the emulsion have an average particle size ($D_{3,2}$) of less than 1 micron, the emulsion comprising fat in an amount of at least 65% by weight of the emulsion; (b) providing powder comprising saccharides, non-saccharide sweetener and/or protein; (c) combining, in a granulation step, the powder and the emulsion to form a mixture with a moisture content of less than 10% by weight of the mixture, wherein the emulsion binds the powder into granules; and (d) recovering the granules from step (c).

15 Claims, 1 Drawing Sheet

(51) Int. Cl.
- *A23D 7/02* (2006.01)
- *A23G 9/44* (2006.01)
- *A23G 9/52* (2006.01)
- *A23P 10/20* (2016.01)
- *A23P 10/40* (2016.01)

(52) U.S. Cl.
CPC ............... *A23G 9/52* (2013.01); *A23P 10/20* (2016.08); *A23P 10/40* (2016.08)

(56) References Cited

U.S. PATENT DOCUMENTS

| | | | |
|---|---|---|---|
| 3,357,840 | A | 12/1967 | Fisher |
| 3,594,192 | A | 7/1971 | Mullen et al. |
| 3,594,193 | A | 7/1971 | Mishkin et al. |
| 4,307,123 | A | 12/1981 | Bundus |
| 4,338,350 | A | 7/1982 | Chen et al. |
| 4,542,035 | A | 9/1985 | Huang et al. |
| 4,861,605 | A | 8/1989 | Moon et al. |
| 5,084,295 | A | 1/1992 | Whelan et al. |
| 5,370,893 | A | 12/1994 | Carey |
| 5,993,873 | A | 11/1999 | Kuslys et al. |
| 6,497,913 | B1 | 12/2002 | Gray et al. |
| 2006/0141103 | A1 | 6/2006 | Heritage et al. |
| 2008/0138486 | A1 | 6/2008 | Jones |
| 2011/0070335 | A1 | 3/2011 | Brugger et al. |

FOREIGN PATENT DOCUMENTS

| | | |
|---|---|---|
| CN | 101917863 | 12/2010 |
| CN | 102458139 | 5/2012 |
| CN | 102687788 | 9/2012 |
| EP | 0277354 | 8/1988 |
| EP | 0727148 | 8/1996 |
| JP | 3064895 | 7/2000 |
| WO | WO8602809 | 5/1986 |
| WO | WO9620270 | 7/1996 |
| WO | WO0001246 | 1/2000 |
| WO | WO2009090249 | 7/2009 |
| WO | WO2010089320 | 8/2010 |
| WO | WO2010089322 | 8/2010 |
| WO | WO2010091983 | 8/2010 |
| WO | WO2012065824 | 5/2012 |
| WO | WO2012089474 | 7/2012 |
| WO | WO2015121237 | 8/2015 |

OTHER PUBLICATIONS

Written Opinion in PCTEP2017063309; May 24, 2018; pp. 1 to 8.
Structures and properties of Food Emulsions; Food Emulsions; Nov. 2003; pp. 19-20; XP002772442; CRC Press. pp. 9 to 10.
Search Report and Written Opinion in PCTEP2017063309; Aug. 4, 2017. pp. 11 to 28.
IPRP in PCTEP2016050572; Feb. 16, 2017, pp. 29 to 47.
Search Report & Written Opinion in EP16175674; Dec. 16, 2016. pp. 1 to 7.
Search Report in EP15151754; Nov. 9, 2015, pp. 8 to 12.
Search Report & Written Opinion in PCTEP2016050572; Mar. 14, 2016. pp. 13 to 30.
Search Report (Partial) in PCTEP2016050572; Feb. 16, 2016. pp. 31 to 38.
Written Opinion in EP15151754 dated Nov. 9, 2015, pp. 39 to 44.
Search Report (Partial) in EP15151754; Jul. 23, 2015, pp. 45 to 49.
K.I. Segall, H.D. Goff*; A modified ice cream processing routine that promotes fat destabilization in the absence of added emulsifier; International Dairy Journal; 2002; pp. 1013-1018; 12. pp. 1 to 6.
Search Report and Written Opinion in EP18178874; Sep. 18, 2018; pp. 7 to 14.
Written Opinion 2 in PCTEP2016050572; Dec. 5, 2016. pp. 15 to 24.
Differences Between Granulated Sugar and Regular Sugar; Difference 2013 pp. 1-2; May 1, 2013; pp. 1-2. pp. 25 to 26.
Goff et al.; Mix Processing and Properties; Ice Cream; pp. 134-139. pp. 27 to 31.
Laifa Huang; Food Thickening Agents (2nd edition);China Light Industry Press; Jan. 31, 2009;pp. 207-228;2nd edition.
Youliang Chen;New Processing Technology of Cattle Products;China Agricultural Press;Oct. 31, 2002;pp. 244-249.
Lan et al.; Nano-material Testing Technology;East China University of Science and Technology Press: Apr. 30, 2009;pp. 128-131.
Changzhou Chen;Micronized TCM—Research and Application of ultrafine powder of TCM; China Medicinal Science Press;Aug. 31, 2007;pp. 16-17.
Search Report and Written Opinion in EP16175639; Dec. 20, 2016.
Modern Processing Technology of Milk and Dairy Products, Zeng Shouying, China Agricultural Press.
English translation of Chinese Office Action for Application Serial No. 201680006539.5 dated Sep. 27, 2000.
Gong et al., Food Machinery and Equipment, p. 57, China Commercial Press, Dec. 31, 1993.
Li et al., Intelligent Instrumentation and Control Devices, Chemical Industry Press, p. 14, Sep. 30, 1998.
English translation of Chinese Office Action for Application Serial No. 201680006539.5 dated Feb. 6, 2020.
English translation of Chinese Office Application for Application No. 201780038671.9 dated Mar. 11, 2022.
Food Separation and Recombination Engineering Technology, Gao Fucheng, et al., pp. 153-154, China Light Industry Press, Jul. 31, 1998.

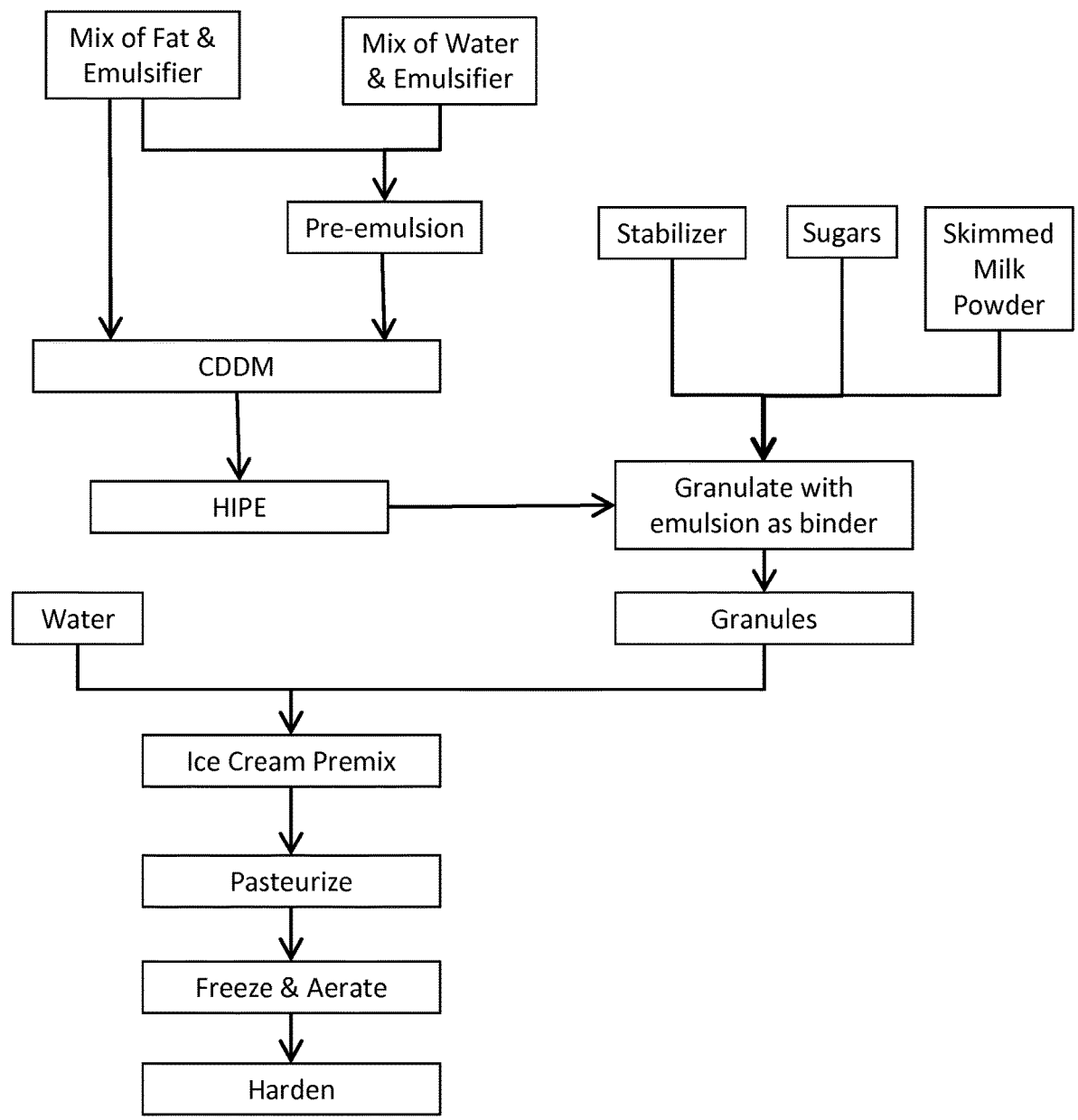

FROZEN CONFECTION MANUFACTURE

FIELD OF THE INVENTION

The present invention relates to the manufacture of frozen confections such as ice creams. More particularly the invention relates to manufacture of frozen confections from granulated concentrates made using concentrated emulsions.

BACKGROUND OF THE INVENTION

The manufacture of ice cream is an energy-intensive process. Regardless of the energy needed to freeze ice cream premix, the formation of the premix itself requires energy in order to mix, disperse and/or dissolve the various ingredients. Moreover for the production of confections with excellent organoleptic properties it is desirable to emulsify any fat in the premix in the form of very small droplets.

For example, WO 00/01246 A (Unilever Plc et al) discloses using an homogenizer operating at high pressures in ice cream manufacturing to generate small oil droplet sizes (ca. 0.3 micron) in an ice cream premix.

Furthermore distribution of ice cream from the production factory to point of sale is also energy-intensive and to ensure maintenance of product quality requires an effective frozen supply chain. This is especially problematic for supply over large distances. One solution to reduce the cold chain requirements would be to build factories closer to the point of sale. Each factory would, however need its own manufacturing equipment and skilled labour thus requiring high investment.

The present inventors have recognized that one or more of the drawbacks associated with current mass production and distribution of ice confections can be ameliorated by providing granulated concentrates that are made using concentrated oil-in-water emulsions and which can be reconstituted to ice cream premix by simple dissolution/dispersal in an aqueous liquid.

SUMMARY OF THE INVENTION

In a first aspect, the present invention is directed to a process for manufacturing a concentrate for making a premix for a frozen confection, wherein the concentrate is in the form of granules and the process comprises the steps of:
(a) forming an oil-in-water emulsion wherein the fat droplets in the emulsion have an average particle size ($D_{3,2}$) of less than 1 micron, the emulsion comprising fat in an amount of at least 65% by weight of the emulsion;
(b) providing powder comprising saccharides, non-saccharide sweetener and/or protein;
(c) combining, in a granulation step, the powder and the emulsion to form a mixture with a moisture content of less than 10% by weight of the mixture, wherein the emulsion binds the powder into granules; and
(d) recovering the granules from step (c).

Granules that are formed by the process have been found to be particularly advantageous as they contain pre-made emulsion and are storage-stable. Thus they can be stored for long times and/or shipped to remote locations without employing a frozen supply chain. The granules can then be dispersed and/or dissolved in an aqueous liquid at a location close to point of sale resulting in a high quality premix without having to employ an homogenizer at the location close to the point of sale. This allows for relatively simple and low-investment "finishing factories" that simply need equipment for dispersing and/or dissolving the granules in the aqueous liquid and then freezing the resulting premix.

By employing an emulsion with a high fat content of 65 wt % or more it is possible to bind the powder into granules without introducing a large amount of moisture into the mixture (i.e. the mixture is formed with less than 10% moisture by weight of the mixture). Thus the granules do not require a drying step and are storage stable immediately on granulation. This not only reduces the amount of energy and equipment needed to produce stable granules but also can produce granules which do not have unwanted off-flavours that occur when the fat in the emulsion is degraded during drying.

The use of concentrated emulsions also allows for increased efficiency of the homogenization equipment because for each portion of ice confection produced, less volume of liquid is passed through the homogenizer. This means that less energy is used per confection and that more confections can be produced per homogenizer.

In order to maximize one or both of the aforementioned advantages of using concentrated emulsions to form the granules, it is preferred that the oil-in-water emulsion comprises fat in an amount of at least 70% by weight of the emulsion, more preferably at least 72%, more preferably still at least 74% and most preferably at least 75%.

Under certain circumstances if the emulsion becomes too concentrated it may become difficult to handle in subsequent processing. Thus it is preferred that the fat content of the emulsion is no more than 87% by weight of the emulsion, more preferably no more than 86%, even more preferably no more than 84%, and most preferably no more than 82%.

To ameliorate or even eliminate the need for any drying step it is preferred that the mixture is formed in step (c) with a moisture content of less than 8% by weight of the mixture, more preferably less than 7%, more preferably still less than 6%, even more preferably less than 5% and most preferably from 0 to 4%.

Preferably the mixture is not subjected to a drying step during the process of manufacturing the granules. More preferably during the granulation step (c), the temperature of the mixture does not exceed 60° C. for more than 1 minute, more preferably does not exceed 60° C. for more than 30 seconds. Preferably also during the granulation step (c), the temperature of the mixture does not exceed 85° C. for more than 10 seconds and most preferably does not exceed 100° C. for more than 1 s.

Any suitable homogenizer may be used to form the emulsion in step (a), including one selected from valve-type homogenizer, rotor-stator, ultrasonic homogenizer, Cavity Transfer Mixer, Controlled Deformation Dynamic Mixer or a combination thereof. Where especially high fat-content emulsions are desirable, it is preferred to use a Cavity Transfer Mixer (CTM), Controlled Deformation Dynamic Mixer (CDDM) or a combination thereof, as these types of homogenizer are especially efficient at creating high-internal phase emulsions (HIPEs). Most preferred is a CDDM. CTM and CDDM configurations and their uses are described, for example, in WO 1996/020270 A, WO 2010/089320 A, WO 2010/089322 A, WO 2010/091983 A, WO 2012/065824 A and WO 2012/089474 A all of which are hereby incorporated by reference in their entirety.

For the production of confections on an industrial scale and with excellent organoleptic properties it is desirable to provide fat in the premix in the form of very small droplets. The emulsion is thus formed in step (a) by homogenization to give fat droplets having an average particle size ($D_{3,2}$) of less than 1 micron, more preferably the fat droplets in the emulsion have an average particle size of no greater than 0.7 micron, more preferably still no greater than 0.6 micron and most preferably from 0.1 to 0.5 micron. Fat particle sizes in can be measured using a Malvern Mastersizer (Malvern Instruments, UK) as follows: The emulsion samples are dispersed in a solution of sodium dodecyl sulphate (SDS) (Sigma UK) and urea (Sigma UK) (6.6 M urea, 0.1% SDS) and then analysed using a Malvern Mastersizer 2000. The SDS/urea solution ensures that any weakly bound or flocculated fat droplets are separated into individual fat droplets; it cannot break up fully coalesced or aggregated fat droplets. 2 g of emulsion are added to 20 ml solution of SDS/urea, mixed and left for 10 minutes. The samples are then added drop-wise into a Mastersizer 2000 for analysis. The samples are characterised by the surface weighted diameter, $D_{3,2}$ which is a measure of the mean fat droplet size.

The fat may be emulsified with any suitable emulsifier provided it is suitable for human consumption. However the present inventors have found that caseinate, especially sodium caseinate is particularly efficient at stabilizing emulsions with high fat contents without introducing high viscosity. Preferably the emulsion comprises caseinate in an amount of from 0.2 to 9% caseinate by weight of the emulsion, more preferably from 0.5 to 7%, more preferably still from 1 to 6% and most preferably from 2 to 5%. Additionally or alternatively, the emulsion comprises emulsifier such that the weight ratio of fat:emulsifier in the emulsion is in the range 5:1 to 30:1, more preferably from 10:1 to 20:1 and most preferably from 12:1 to 18:1.

On the other hand, the present inventors have found that whey protein or substances comprising whey protein (such as skimmed milk powder) may in certain circumstances cause high fat emulsions to unduly thicken or even gel. Thus it is preferred that the emulsion is substantially free from whey protein, more preferably the emulsion comprises less than 0.1% whey protein by weight of the emulsion, even more preferably less than 0.05% and most preferably from 0 to 0.01%.

There is no limitation to the type of fat used in the emulsion provided it is suitable for human consumption. However it is preferred that fat with a relatively high melting point is used as such fats allow for producing frozen confections with good aeration and/or good mouth-feel. Preferably the fat comprises or consists of one or more fats selected from coconut fat, palm fat, dairy fat or a mixture thereof, most preferably the fat comprises or consists of coconut fat, palm fat or a mixture thereof.

The powder provided in step (b) comprises saccharides, non-saccharide sweetener, protein or a combination thereof. The saccharides preferably comprise or consist of saccharides selected from lactose, sucrose, dextrose, maltose, fructose, glucose oligosaccharides (e.g. from corn syrup, glucose syrup, maltodextrin or a mixture thereof), polysaccharides (such as starch, locust bean gum, carrageenan, guar gum, tara gum or a mixture thereof) or a mixture thereof. The total amount of saccharides in the powder is preferably in the range of from 45 to 95% by weight of the powder, more preferably 50 to 90% and most preferably from 55 to 85%. In addition to or as replacement for the saccharides, non-saccharide sweetener may be present in the powder. The non-saccharide sweetener preferably comprises intense sweeteners (for example, aspartame, saccharin, acesulfame K, alitame, thaumatin, cyclamate, glycyrrhizin, stevioside, neohesperidine, sucralose, monellin, neotame and mixtures thereof), sugar alcohols (for example, hydrogenated starch hydrosylate, eythritol, arabitol, glycerol, xylitol, sorbitol, mannitol, lactitol, maltitol, isomalt, palatinit and mixtures thereof) or a mixture thereof. The protein is preferably milk protein, more preferably casein, whey protein or a mixture thereof. Suitable sources of protein in powder form include, for example, whole milk powder, skim milk powder, yoghurt powder, whey powder, caseinate, or a mixture thereof. The total amount of protein in the powder is preferably in the range of from 1 to 20% by weight of the powder, more preferably 2 to 15% and most preferably from 3 to 12%. The powder may comprise ingredients other than saccharides and/or protein. For example the powder may comprise emulsifiers (such as mono-diglycerides and the like), flavours, acids, minerals, cocoa solids, vitamins or a combination thereof. Preferably the powder comprises less than 10% moisture by weight of the powder, more preferably less than 8%, more preferably still less than 6% and most preferably from 0 to 4%.

The granulation step (c) can be achieved, for example, by any equipment and process suitable for agglomerating the powder with the emulsion. Granulation equipment is widely available and preferred types include, for example, ploughshare mixers, Nauta mixers, screw extruders and the like.

Upon recovering the granules in step (d) they may be used immediately to make ice cream premix. Preferably however they are packaged and/or stored upon recovery in step (d).

In a second aspect, the invention provides a process for manufacturing a premix for a frozen confection, the process comprising the steps of:
  (i) manufacturing the concentrate according to any embodiment of the process of the first aspect;
  (ii) optionally providing an adjunct composition comprising saccharides, non-saccharide sweetener, protein or a combination thereof;
  (iii) providing an aqueous liquid, preferably water; and
  (iv) combining the concentrate and the aqueous liquid and optionally the adjunct composition.

In one embodiment the process involves manufacturing the granules in step (i) at a first location, transporting the granules to a location remote from the first location and then combining the granules and aqueous liquid in step (iv) at the remote location. By "remote location" is meant a location at least 10 km from the first location, more preferably at least 50 km and most preferably at least 100 km.

The aqueous liquid may be any edible liquid such as milk, saccharide solution or a combination thereof. The liquid is aqueous and preferably comprises at least 50% water by weight of the liquid, more preferably at least 70%, more preferably still at least 80% and most preferably from 90 to 100%. In a preferred embodiment the aqueous liquid is water.

The adjunct composition (when used) comprises the balance of ingredients for the premix other than those in the concentrate and the aqueous liquid. The adjunct composition comprises saccharides, non-saccharide sweetener, protein or a combination thereof. The saccharides preferably comprise or consist of saccharides selected from lactose, sucrose, dextrose, maltose, fructose, glucose oligosaccharides (e.g. from corn syrup, glucose syrup, maltodextrin or a mixture thereof), polysaccharides (such as starch, locust bean gum, carrageenan, guar gum, tara gum or a mixture thereof) or a mixture thereof. The total amount of saccharides in the adjunct composition is preferably in the range of from 45 to 95% by weight of the adjunct composition, more preferably 50 to 90% and most preferably from 55 to 85%. In addition to or as replacement for the saccharides, non-saccharide sweetener may be present in the adjunct composition. The non-saccharide sweetener preferably comprises intense sweeteners (for example, aspartame, saccharin, acesulfame K, alitame, thaumatin, cyclamate, glycyrrhizin, stevioside, neohesperidine, sucralose, monellin, neotame and mixtures thereof), sugar alcohols (for example, hydrogenated starch hydrosylate, eythritol, arabitol, glycerol, xylitol, sorbitol, mannitol, lactitol, maltitol, isomalt, palatinit and mixtures thereof) or a mixture thereof. The protein is preferably milk protein, more preferably casein, whey protein or a mixture thereof. Suitable sources of protein in powder form include, for example, whole milk powder, skim milk powder, yoghurt powder, whey powder, caseinate, or a mixture thereof. The total amount of protein in the adjunct composition is preferably in the range of from 1 to 20% by weight of the adjunct composition, more preferably 2 to 15% and most preferably from 3 to 12%. The adjunct composition may comprise ingredients other than saccharides and/or protein. For example the adjunct composition may comprise emulsifiers (such as mono-diglycerides and the like), flavours, acids, minerals, cocoa solids, vitamins or a combination thereof. Preferably the adjunct composition comprises less than 30% moisture by weight of the adjunct composition, more preferably from 0 to 15%.

The concentrate, adjunct composition (when used) and aqueous liquid may be combined in any order in step (iv). For example they may all be combined simultaneously in a single mixing process. Alternatively the concentrate may be diluted with the aqueous liquid and then combined with the adjunct composition.

In a preferred embodiment step (iv) comprises dispersing and/or dissolving the granules of the concentrate in the aqueous liquid.

The process of the second aspect preferably provides a premix comprising:
A. fat in an amount of from 2 to 20% by weight of the premix;
B. saccharides and/or non-saccharide sweeteners in a total amount of from 10 to 30% by weight of the premix;
C. protein in an amount of from 2 to 10% by weight of the premix; and
D. water in an amount of from 55 to 80% by weight of the premix.

In a third aspect the present invention provides a process for manufacturing a frozen confection comprising manufacturing a premix according to the process of any embodiment of the second aspect of the invention and then freezing and optionally aerating the premix.

In a further aspect, the present invention provides granulated concentrate obtained and/or obtainable from the process of any embodiment of the first aspect.

In a preferred embodiment, the concentrate in the form of granules comprises:
a) saccharides and/or non-saccharide sweetener in a total amount of from 40 to 90% by weight of the concentrate, preferably from 50 to 80%, most preferably 55 to 75%;
b) protein in an amount of from 1 to 15% by weight of the concentrate, preferably from 2 to 12%, most preferably from 4 to 10%; and
c) fat in an amount of from 1 to 25% by weight of the concentrate, preferably from 3 to 22%, more preferably from 5 to 20%, most preferably from 7 to 18%; wherein the fat comprises emulsified fat droplets.

An advantage of this embodiment is that it contains most (if not all) of the solid components of an ice cream mix and so simply needs diluting with water to form a suitable mix.

In a further embodiment, the concentrate in the form of granules comprises:

a) saccharides and/or non-saccharide sweetener in a total amount of from 70 to 95% by weight of the concentrate, preferably from 75 to 90%, most preferably 80 to 88%; and
b) fat in an amount of from 3 to 25% by weight of the concentrate, preferably from 4 to 22%, more preferably from 5 to 20%, most preferably from 7 to 18%; wherein the fat comprises emulsified fat droplets.

An advantage of this embodiment is that it contains the emulsified droplets carried mainly by the saccharides such that it can be customised on dilution to make mixes suitable for a whole range of frozen confections.

In a third embodiment, the concentrate in the form of granules comprises:
a) protein in an amount of from 10 to 50% by weight of the concentrate, preferably from 15 to 40%, most preferably 20 to 30%; and
b) fat in an amount of from 3 to 25% by weight of the concentrate, preferably from 4 to 22%, more preferably from 5 to 20%, most preferably from 7 to 18%; wherein the fat comprises emulsified fat droplets.

An advantage of this embodiment is that it contains the emulsified droplets in combination with a relatively large amount of protein such that it can be customised on dilution to make mixes with a variety of saccharide contents.

Preferably the fat in this third embodiment is fat other than dairy fat. More preferably the fat comprises or consists of coconut fat, palm fat or a mixture thereof.

Preferably the balance of the concentrate in the third embodiment is non-saccharide, sweetener, saccharides or a mixture thereof. Most preferably the concentrate of the third embodiment comprises saccharides, where the saccharides comprise or consist of lactose.

The concentrates of the second and third embodiments may, for example, conveniently be used together and combined in different ratios to make a variety of frozen confection mixes.

In any embodiment, the concentrate may comprise ingredients other than saccharides, fat and protein. For example the concentrate may comprise emulsifiers (such as mono-diglycerides and the like), flavours, acids, minerals, cocoa solids, vitamins or a combination thereof. Preferably the concentrate comprises less than 8% moisture by weight of the concentrate, more preferably less than 7%, more preferably still less than 6%, even more preferably less than 5% and most preferably from 0 to 4%.

The granules of concentrate typically have a bulk density of less than 1000 kg m$^{-3}$, more preferably in the range 600 to 900 kg m$^{-3}$. Additionally or alternatively the granules preferably have an average particle size ($D_{50}$) of at least 300 microns, more preferably in the range 400 micron to 4 mm.

Granule bulk density can be measured as follows: Granules are slowly poured through the stainless steel funnel attachment of a Flowability Tester BEP2 (Copley Scientific) into a pre-weighed receiving cup until it overflows. The top of the cup is gently leveled with a spatula and reweighed with its contents. The bulk density is calculated in terms of grams per mL by dividing the weight of the granules by the volume of the cup.

Granule particle size can be measured using sieve analysis as follows: Sieves (conforming to British Standard BS 410 and with 200 mm diameter of the frame) are stacked in the following order from top to bottom—2.36 mm, 1.40 mm, 1.00 mm, 0.710 mm, 0.425 mm, 0.250 mm, 0.125 mm and receiving pan. The top sieve is loaded with 200 g of granules and size separation is achieved by shaking the sieve stack at amplitude of 0.8 for 5 minutes on a Glen Creston (VE 1000)

sieve shaker. The granules retained on each sieve are weighed to plot the size distribution curve. $D_{50}$ is the size in microns that splits the distribution with half (by weight) above and half below this diameter.

The fat droplets in any embodiment preferably have an average particle size ($D_{3,2}$) of less than 1 micron, preferably from 0.1 to 0.7 micron.

It is particularly preferred that the fat droplets are not uniformly distributed within the granules, but are located in discrete regions within the granules. For example when visualized using scanning electron microscopy (SEM) the fat droplets are preferably located in discrete regions separated by discrete regions free from fat droplets. Preferably the length scale (largest measurable linear distance in any direction) of the discrete regions is greater than 5 micron, more preferably from 10 to 100 micron. Examples of micrographs showing granules with fat localization can be found in co-pending International Patent Application with application number PCT/EP2016/050572 (Unilever N V et al.), the contents of which are hereby incorporated by reference in their entirety.

Because the process of the invention allows for formation of stable granules with minimal or no drying, the granules typically are free from fat oxidation products such as, for example, hexanal.

All other aspects of the present invention will more readily become apparent upon considering the detailed description and examples which follow.

DETAILED DESCRIPTION

The present invention will now be described, by way of example only, with reference to the FIGURES, wherein:

FIG. 1 shows a flow diagram for frozen confection manufacture according to one embodiment of the invention.

Referring to FIG. 1, in one embodiment of the invention an ice cream manufacturing process begins with forming two phases: a fat phase and an aqueous phase. The fat phase is a mix of fat and emulsifier. The aqueous phase is a mix of water and emulsifier which may be the same or a different emulsifier than in the fat phase. The two phases may be gently heated in separate tanks to melt the fat and/or ensure good dissolution/dispersion of the emulsifiers.

Part of the fat phase is added to the tank containing the aqueous phase and the resulting mixture is mixed and/or homogenized to produce a crude concentrated emulsion (the "pre-emulsion"). The pre-emulsion may, for example have a fat content of from 60 to 70% by weight.

The remaining fat phase and the pre-emulsion are then then fed together and homogenized through a CDDM to produce a concentrated oil-in-water emulsion wherein the fat droplets have an average particle size below 1 micron. The concentrated emulsion is a high internal phase emulsion (HIPE) and may, for example have a fat content of around 80% by weight.

The concentrated emulsion may also be optionally pasteurized or sterilized at this point which, for example, gives more flexibility in the manufacturing process as the emulsion can be stored until needed or even transported to a remote location for further processing.

In the next step of the process shown in FIG. 1 the concentrated emulsion is used to agglomerate powder ingredients (for example sugars, stabilizer, skimmed milk powder and emulsifier) into granules. Because of the low water content of the HIPE, it can be used to granulate the powders without requiring a drying step. Granulation equipment is widely available and preferred types include, for example, ploughshare mixers, Nauta mixers, screw extruders and the like.

The granules are much more storage stable than a liquid emulsion and so can be stored for longer and/or transported for longer distances. The concentrate can be shipped to a remote location in the form of granules which simply need dissolving/dispersing at the remote location without any need for handling and blending multiple powders.

Furthermore shipping the powder ingredients as preformed granules avoids any issues of powder separation which may be encountered if powders were simply blended prior to shipping.

Furthermore, as shown in FIG. 1, formation of the premix requires simply combining the granules with water to disperse/dissolve the granules. Surprisingly the present inventors have found that granules wherein the emulsion is used as binder can form ice cream premixes of good quality without the use of complex mixing equipment. Without being bound by theory the inventors believe this may be due to the presence of the fat as discrete droplets within the powder or at least the localization of such droplets in discrete regions within the granules.

The full premix can then optionally be pasteurized. An additional or alternative step is ageing the premix at temperatures between 0 and 10° C. in order to promote fat crystallization which helps in aerating the mix in subsequent steps.

The next step shown in FIG. 1 is freezing & aerating the premix which can conveniently be achieved simultaneously in a scraped surface heat-exchanger, to produce the ice cream. Finally the frozen and aerated ice cream is optionally hardened, for example by blast-freezing at a temperature below −20° C., and is then ready for storage and/or distribution.

Although the invention has been described with reference to specific embodiments, various modifications of the described modes for carrying out the invention which are apparent to those skilled in the relevant fields are intended to be within the scope of the following claims.

Except in the examples, or where otherwise explicitly indicated, all numbers in this description indicating amounts of material or conditions of reaction, physical properties of materials and/or use may optionally be understood as modified by the word "about".

All amounts are by weight unless otherwise specified.

It should be noted that in specifying any range of values, any particular upper value can be associated with any particular lower value.

For the avoidance of doubt, the word "comprising" is intended to mean "including" but not necessarily "consisting of" or "composed of". In other words, the listed steps or options need not be exhaustive.

The disclosure of the invention as found herein is to be considered to cover all embodiments as found in the claims as being multiply dependent upon each other irrespective of the fact that claims may be found without multiple dependency or redundancy.

Where a feature is disclosed with respect to a particular aspect of the invention (for example a concentrate of the invention), such disclosure is also to be considered to apply to any other aspect of the invention (for example a process of the invention) mutatis mutandis.

EXAMPLES

Comparative Example A

This example demonstrates formation of a concentrate in the form of granules wherein an emulsion was used as binder but wherein drying is required to produce stable granules.

An oil-in-water emulsion containing 60 wt % coconut fat (Cargill), 4.2 wt % sodium caseinate (Frieslandcampina) and 35.8 wt % water was prepared as follows: Hot water at 82° C. was added to a mix vessel, followed by the sodium caseinate. The contents of the vessel were vigorously mixed for 5-7 minutes to ensure complete dispersion/dissolution of sodium caseinate. The pre-melted fat/oil was then metered into the vessel and the mixture was agitated at high speeds for further 10 minutes. The mixing operation typically took around 20 minutes. The resulting coarse emulsion was then pumped through a two stage homogenizer (Tetra Alex S05 A supplied by Tetra Pak) at a pressures of 175 bar and 30 bar in the 1st and 2nd stages respectively. The homogenized emulsion was then stored in the storage vessel before being used for granulation.

The ingredients shown in Table 1 were then blended into a single powder:

TABLE 1

| Ingredient | Amount (% by weight of total powder blend) |
| --- | --- |
| Mono-diglyceride emulsifiers | 1.2 |
| Stabilizers (Locust Bean Gum, Guar Gum + Carrageenan) | 0.65 |
| Skimmed Milk Powder | 23 |
| Whey Protein Concentrate | 6.1 |
| Maltodextrin and Glucose Syrup | 31 |
| Sucrose | Balance |

A Nauta mixer (Hosokawa Micron) of 60 liter working volume was used to prepare granules using the concentrated emulsion as binder. In total 25 kg of the powder blend (composition shown in Table 1) was loaded into the mixer. The powder was allowed to mix for 5 minutes using a screw speed of 120 rpm. The concentrated emulsion was then added manually by scoop. The amount of emulsion was ~5 kg which was added slowly over the duration of 25 minutes. When the binder/emulsion addition was complete, the mixer was allowed to run for further 5 minutes before discharge. The water activity of these granules was greater than 0.6.

The granules were then loaded into a batch fluid bed dryer (GEA Aeromatic Fielder MP1). The batch size of the dryer was 6 kg. The bed was first fluidized at ambient temperature at inlet air flow in the range of 20% to 30%. Temperature of the fluidizing bed was then raised at the rate of 10-15° C. per minute to 60-65° C. After 10 minutes of drying at elevated temperature, the inlet air temperature was switched back to ambient and the bed was discharged after cooling down to 35° C. The water activity of the dried granules was less than 0.6 and the moisture content was around 4% by weight.

GC-MS (Agilent 6890) was used to characterize the granules for the presence of hexanal (an indicator of lipid oxidation). An analytical grade hexanal standard was used to identify retention times of the compound. The analysis was undertaken by extracting ions with an m/z value of 56±0.3 and integrating peaks at a time of 5.45-5.55 mins. A PAL ITEX-2 auto sampling system (CTC Analytics) was used to prepare and load samples into an Rxi-5 ms column (30 m×0.25 mm×0.25 μm film thickness, fused silica capillary; Restek), used in conjunction with an Agilent 5973 Network Mass Selective Detector. 1 g samples of granules were diluted in 5 g of deionised water in vials and shaken by hand for 20 seconds, to ensure complete dissolution prior to loading into the auto sampler. Measurements were repeated at least once.

For granules, PAL system settings were 20 extraction strokes and 10 mins incubation time at 60° C. 1000 μL of headspace was extracted with each stroke, and a split ratio of 10:1 was used upon injection into the column. Chemical standards underwent only one extraction stroke, following 30 secs incubation time at 60° C. Additionally a split ratio of 75:1 was used for the chemical standards. A blank/empty vial was run between each sample, and trap cleaning was carried out prior to running and after the chemical standards.

Hexanal was clearly present (peak area of over 26000 arbitrary units) in the fresh granules indicating that fat oxidation had occurred during the drying process.

Example 1

This example demonstrates formation of a concentrate in the form of granules wherein a concentrated emulsion was used as binder with sufficient fat content to avoid any requirement for drying to produce stable granules.

An aqueous phase, an oil phase and an emulsion were prepared and the said oil phase and emulsion were then combined to form a HIPE as set out below. The composition of the HIPE is shown in Table 2.

TABLE 2

| Ingredient | % by weight of emulsion |
| --- | --- |
| Coconut oil | 76 |
| Mono-di glyceride | 3 |
| Sodium Caseinate | 3 |
| Water | 18 |

The aqueous and oil phases and emulsion were prepared according to the following method:

1.1 A 2 litre steel container was placed on a hot plate into which 0.425 kg of boiling water was introduced. 75 grams sodium caseinate was added slowly to the boiling water while stirring with an IKA ULTRA-TURRAX T18 with a S 18 N-19 G Dispersing element. Stirring was continued until visually the sodium caseinate was judged to be in solution. The temperature of the resultant aqueous phase was held at ~80° C.

1.2 2880 grams of coconut oil was slowly melted in a 5 litre vessel. The coconut oil temperature was raised to ~90° C. 120 g of Mono-di glyceride (HP60) was added to the molten oil. The mixture was stirred by hand until the HP60 dissolved to form a transparent solution. The temperature of the resultant oil phase was held at ~80° C.

1.3 1.17 kg of the oil phase prepared according to 1.2 was transfered into the steel container over a period of 10 minutes while stirring with an IKA EUROSTAR overhead stirrer fitted with a Jiffy Mixer [HS-1] O.D. 67 mm. Stirring speed was maintained at 1000 rpm to produce a concentrated oil-in-water emulsion. Stirring was continued for a further 10 minutes throughout which the temperature of the resultant oil-in-water emulsion was held at ~80° C.

The oil phase and emulsion prepared according to 1.2 and 1.3, respectively, were combined and mixed in the appropriate proportion to form the HIPE of Table 2 via a continuous mixing assembly comprising the following:

2.1 Two hoppers, the first hopper (1 litre capacity) containing the oil phase from 1.2 and the second hopper (5 litre capacity) containing the emulsion from 1.3.

2.2 Two progressive cavity pumps [Supplier=Mono Pumps, Spec. No.=LF052], the first being gravity fed from the first (oil phase) hopper and the second being gravity fed from the second (emulsion pre-mix) hopper.

2.3 A gear pump [Supplier=Pump Solutions Group, Spec. No=MARG CI NO CX22/13], which is attached to the outlets of each of the progressive cavity pumps by pipework configured as a "T" piece, which enables the output streams from each of the two progressive cavity pumps to be combined into a single feed stream to the inlet of said gear pump.

2.4 A CDDM [Supplier=Maelstrom Advanced Process Technologies Limited, Spec. No.=MaPP Benchtop System mk 1.0] attached at the inlet to the outlet of said gear pump, and from the outlet of which a HIPE is discharged.

The resulting HIPE had a droplet size $D_{3,2}$ of 0.57 µm.

The ingredients shown in Table 3 were then blended into a single powder:

TABLE 3

| Ingredient | Amount (% by weight of total powder blend) |
| --- | --- |
| Mono-diglyceride emulsifiers | 0.31 |
| Stabilizers (Locust Bean Gum, Guar Gum + Carrageenan) | 0.64 |
| Skimmed Milk Powder | 23 |
| Whey Protein Concentrate | 6.2 |
| Maltodextrin and Glucose Syrup | 31 |
| Sucrose | Balance |

A Nauta mixer of 20 liter working volume was used to prepare granules using the HIPE as binder. In total 10 kg of powder blend (composition shown in Table 3) was loaded into the mixer. The powder was allowed to mix for 5 minutes using a screw speed of 120 rpm. The HIPE was then added manually by scoop. The amount of HIPE was around 2.6 kg which was added slowly over the duration of 25 minutes. When the binder/HIPE addition was complete, the mixer was allowed to run for further 5 minutes before discharge. The water activity of these granules was less than 0.6 (moisture content of about 5% by weight), which shows appropriate microbiological stability without the need of drying step.

The hexanal content of the granules was analyzed using the same GC-MS method as set out in Example A. In this case no peak for hexanal was detectable even after storage for 12 weeks.

The invention claimed is:

1. A process for manufacturing a concentrate for making a premix for a frozen confection, wherein the concentrate is in the form of granules and the process comprises the steps of: (a) forming an oil-in-water emulsion wherein the fat droplets in the emulsion have an average particle size characterised by the surface weighted diameter $D_{3,2}$ of less than 1 micron, the emulsion comprising fat in an amount of from 70 to 87% by weight of the emulsion; (b) providing powder comprising saccharides, non-saccharide sweetener and/or protein, the powder including 45-95 wt % saccharides by weight of the powder; (c) combining, in a granulation step, the powder and the emulsion to form a mixture with a moisture content of less than 10% by weight of the mixture, wherein the emulsion binds the powder into granules; and (d) recovering the granules from step (c), the mixture is not being subjected to a drying step during the process of manufacturing the granules.

2. The process as claimed in claim 1, wherein the mixture is formed in step (c) with a moisture content of less than 8% by weight of the mixture.

3. The process as claimed in claim 1, wherein during the granulation step (c), the temperature of the mixture does not exceed 60° C. for more than 1 minute.

4. The process as claimed in claim 1, wherein step (a) comprises homogenisation with a Controlled Deformation Dynamic Mixer.

5. The process as claimed in claim 1, wherein the emulsion comprises from 72 to 84% fat by weight of the emulsion.

6. The process as claimed in claim 1, wherein the fat droplets in the emulsion have an average particle size ($D_{3,2}$) of from 0.1 to 0.7 micron.

7. The process as claimed in claim 1, wherein the emulsion comprises caseinate.

8. A process for manufacturing a premix for a frozen confection, the process comprising the steps of:
   i. manufacturing a concentrate according to the process of claim 1;
   ii. optionally providing an adjunct composition comprising saccharides, non-saccharide sweetener, protein or a combination thereof;
   iii. providing an aqueous liquid, preferably water; and
   iv. combining the concentrate and the aqueous liquid and optionally the adjunct composition.

9. The process as claimed in claim 8 wherein step (iv) comprises dispersing and/or dissolving the granules of the concentrate in the aqueous liquid.

10. A process for manufacturing a frozen confection comprising manufacturing a premix according to the process of claim 8 and then freezing and optionally aerating the premix.

11. The process as claimed in claim 2, wherein the mixture is formed in step (c) with a moisture content of from 0 to 7% by weight of the mixture.

12. The process as claimed in claim 4, wherein step (a) comprises homogenisation with a Controlled Deformation Dynamic Mixer.

13. The process as claimed in claim 5, wherein the emulsion comprises from 74 to 82% fat by weight of the emulsion.

14. The process as claimed in claim 7, wherein the emulsion comprises sodium caseinate.

15. The process as claimed in claim 1 wherein the concentrate is substantially free from hexanal.

* * * * *